United States Patent [19]
Maul et al.

[11] Patent Number: 5,600,671
[45] Date of Patent: Feb. 4, 1997

[54] INFORMATION TRANSMISSION METHOD FOR TRANSMITTING DIGITAL INFORMATION

[75] Inventors: Jürgen Maul, Sulzbach-Rosenberg; Manfred Sand; Georg Trummer, both of Amberg; Werner Schlieker, Nürnberg, all of Germany

[73] Assignee: Siemens Aktiengesellschaft, Munich, Germany

[21] Appl. No.: 439,556

[22] Filed: May 11, 1995

Related U.S. Application Data

[63] Continuation of Ser. No. 100,938, Aug. 3, 1993, abandoned.

[30] Foreign Application Priority Data

Aug. 5, 1992 [EP] European Pat. Off. ............. 92113370

[51] Int. Cl.⁶ ............................................ H04B 1/38
[52] U.S. Cl. .................. 375/211; 375/219; 364/245.1; 370/472
[58] Field of Search .......................... 375/211, 219, 375/220; 370/82, 83, 79, 99, 85.11; 364/238.6, 238.7, 239, 239.51, 239.7, 245.1; 365/189.12, 219

[56] References Cited

U.S. PATENT DOCUMENTS

| | | | |
|---|---|---|---|
| 3,638,195 | 1/1972 | Brender et al. | 340/172.5 |
| 4,686,691 | 8/1987 | Deal et al. | 365/219 |
| 4,788,693 | 11/1988 | Bays et al. | 370/83 |
| 4,912,723 | 3/1990 | Verbanets, Jr. | 375/7 |
| 4,939,722 | 7/1990 | Beichler | 370/112 |
| 5,146,577 | 9/1992 | Babin | 365/219 |
| 5,287,352 | 2/1994 | Jackson et al. | 370/82 |
| 5,309,441 | 5/1994 | Kuroda | 370/112 |

FOREIGN PATENT DOCUMENTS

| | | |
|---|---|---|
| 0159941 | 10/1985 | European Pat. Off. . |
| 0345493 | 12/1989 | European Pat. Off. . |
| 0367830 | 5/1990 | European Pat. Off. . |
| 3603751 | 8/1987 | France . |
| 8401947 | 1/1986 | Netherlands . |
| 2080000 | 1/1982 | United Kingdom . |
| WO9114324 | 9/1991 | WIPO . |

*Primary Examiner*—Wellington Chin
*Assistant Examiner*—Timothy J. May
*Attorney, Agent, or Firm*—Kenyon & Kenyon

[57] ABSTRACT

A modular programmable controller, comprised of a central processing unit and peripheral units, has a serial bus system in the form of a shift register. The total length of the shift register is equal to the sum of the individual register lengths of the bus interface connections of the peripheral units. The individual register lengths of the bus interface connections are dependent upon command and peripheral units. The individual register lengths amount to between 0 and 40 bits. This results in an exceptionally efficient exchange of information between the central processing unit and peripheral units.

32 Claims, 6 Drawing Sheets

INFORMATION TRANSMISSION METHOD FOR TRANSMITTING DIGITAL INFORMATION

This application is a continuation of application Ser. No. 08/100,938, filed on Aug. 3, 1993 now abandoned.

BACKGROUND OF THE INVENTION

The present invention relates generally to methods for transmitting digital information between a main unit and a number of subunits of an electrical device, and preferably to a method for transmitting digital information between a main unit and subunits of a modular programmable controller. The method of the present invention transmits digital information via a serial bus system having at least one data line for transmitting the information, one timing line for specifying a shared system clock, and at least one control line for transmitting control signals. In the method of the present invention, at least the data line may run through the subunits so that the bus system is operable as a shift register having a total register length equal to the sum of individual register lengths of the subunits. The present invention also relates generally to electrical devices for implementing the method.

German 36 03 751 A1 discloses a method for transmitting digital information between a main unit and a number of subunits. The method applied therein for transmitting information via a circulating register is not yet quite optimal, since in order to transmit the information, the entire register must always be cleared, and the register lengths of the individual modules or peripheral units must be definitively preset. Thus, when information is supposed to be transmitted, for example, to only one of the peripheral units, a great deal of blank information must be transmitted along with it. This reduces the theoretically attainable speed of information transmission.

The present invention is directed to the problem of developing a method for transmission of digital information over a serial bus system, which is designed as a shift register, yet which method operates as flexibly, efficiently, and almost as user-friendly as a parallel bus system.

SUMMARY OF THE INVENTION

The present invention solves this problem by transmitting both commands and data within the information, and when data are transmitted, by adjusting the individual register lengths of the subunits in dependence upon the last transmitted command. Analogously, the subunits of the electrical unit have bus interface connections, whose individual register lengths are variable.

A serial-parallel conversion of the transmitted or to-be-transmitted information takes place advantageously in the subunits and in the main unit. For this purpose, the bus interface connections have serial-parallel converters.

The bus system preferably has at least one additional control line, so that the subunits can differentiate between command and data transmissions. This makes it possible, namely, for all subunits to simultaneously receive and evaluate a command when it is transmitted. This considerably increases the efficiency of the information transmission.

The efficiency can be enhanced further when one single subunit reacts to one part of the commands, so-called single commands, and when several, especially all, of the peripheral subunits react to another part of the commands, the so-called group commands.

The information transmission method is especially fail-safe when a frame mark is able to be transmitted along with the information transmissions, making it possible to detect transmission errors. A frame mark should always be transmitted along with the transmission of commands, especially along with the transmission of single commands.

It is particularly simple and user-friendly to initially operate and restart the device when the main unit automatically determines the number, and in some instances, the grouping of the peripheral subunits at start-up, as well as automatically identifies and parameterizes the subunits.

To increase the efficiency of the bus system, the individual register lengths should not only be dependent upon the commands, but also upon the subunits.

When the minimal individual register lengths of the subunits are zero, the bus system can not only be operated as a shift register, but also as a serial bus. The possible individual register lengths are preferably 0 bit, 1 bit, and integral multiples of 8 bits.

The reliability of the information transmission is enhanced further when the bus system has at least one acknowledgement line to transmit acknowledge signals from the subunits to the main unit. This allows the subunits to acknowledge information transmitted via the bus.

When the bus system additionally has an alarm line to signal alarms triggered by the subunits to the main unit, the subunits are able to be designed with alarm capability.

The bus system can be terminated by the bus interface connections when in addition to the data line, the control line is also run through the bus interface connections. Preferably, the timing line, as well as in some instances other control lines, such as the alarm line and the acknowledgement line can also be run through the bus interface connections. In this manner, it is possible to devise separate bus systems, which are independent of one another, within the same electrical device, and thus to create parallel processing possibilities and/or hierarchically structured systems. Therefore, not only can the main unit be a central processing unit, but an intelligent peripheral module as well, which, in turn, has its own bus segment having several allocated or allocatable subunits. As a rule, the subunits are peripheral modules.

When the bus system has a release line, by means of which the outputs of output units are able to be coupled into or rather separated from the bus system, the possibility of blocking the outputs during critical operating states is able to be realized, as known from programmable controllers having a parallel bus. The release circuit is conducted through the bus interface connection only in the case of units which can terminate the bus system, so that the release or blocking signal transmitted via the release circuit is able to be received simultaneously by all output units of the electrical device.

DETAILED DESCRIPTION

Figure 1:
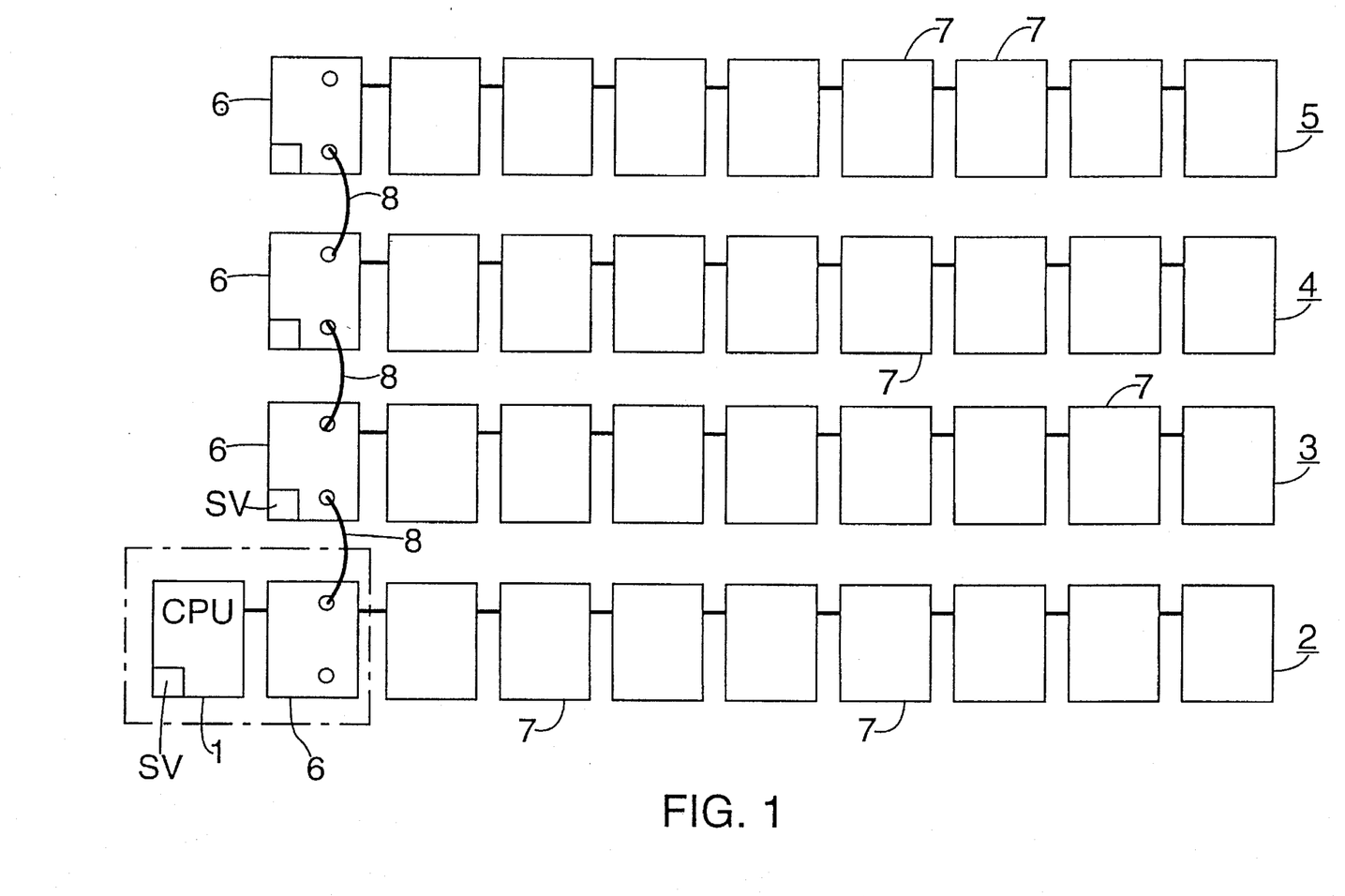
FIG. 1 depicts a block diagram of a programmable controller.

In accordance with FIG. 1, the maximum structure of a modular electrical device, in this case a programmable controller, consists of a central processing unit 1 and four groups or strands 2–5. Each strand 2–5 consists of an interface unit 6 and eight peripheral units 7. The peripheral units 7 are also described in the following as modules. Addresses 0 through 7 are always allocated to modules 7 of strand 2; addresses 8 through 15 to those of strand 3, etc. With respect to the mechanical-design structure of the programmable controller and of the bus system, reference is made to U.S. patent application Ser. No. 07/923,286, which was filed on Jul. 31, 1992, the subject matter of which is hereby incorporated by reference.

The interface units 6 are interconnected via multicore cables 8. The cables 8 can be up to 20 meters long, thus making it possible for a distributed system to be realized.

The programmable controller is supplied with power strand by strand. Thus, each strand 2–5 has its own power supply SV. The power supply SV, as depicted in FIG. 1, is preferably integrated in the interface units 6, or rather in the central processing unit 1. Preferably, the interface unit 6 of strand 2 is also integrated in the central processing unit 1.

The communication between the central processing unit 1 and the peripheral units 7 takes place via a bus system, whose structure is clarified in the following in conjunction with FIG. 2.

Figure 2:
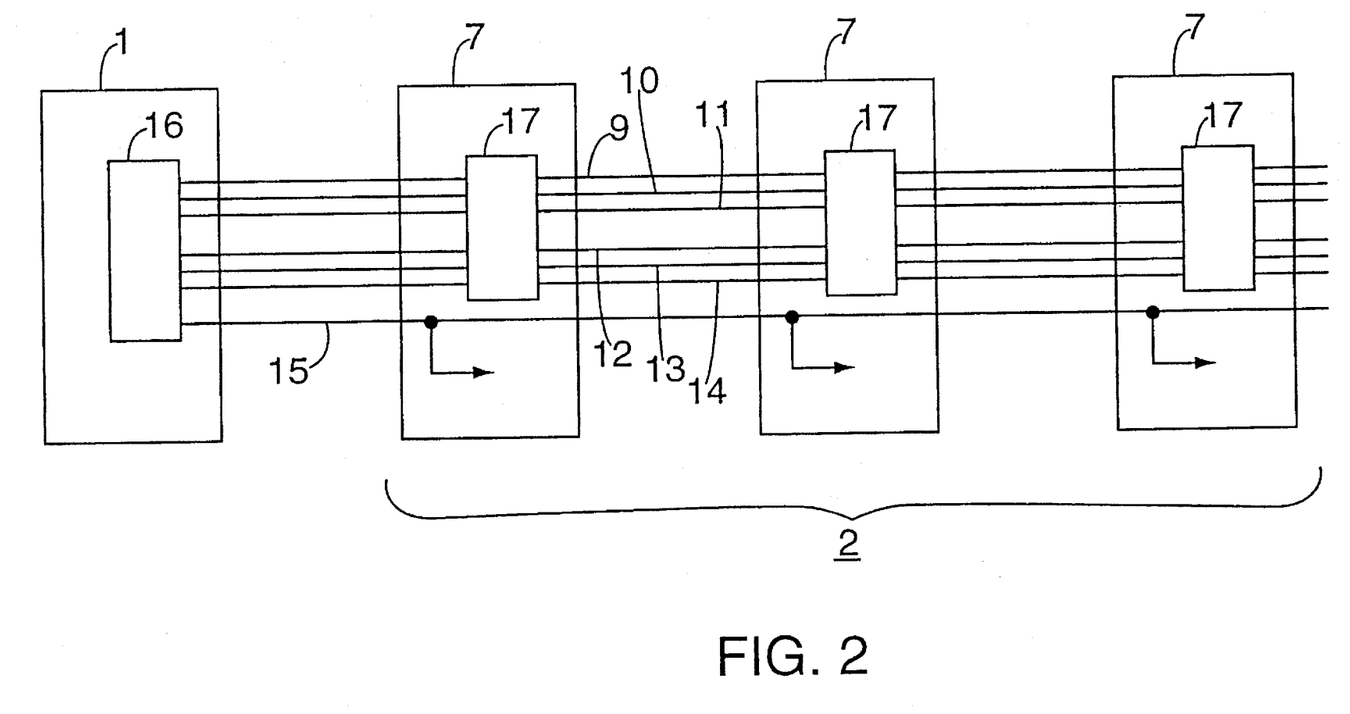
FIG. 2 depicts the bus system of a programmable controller.

FIG. 2 shows a seven line bus system for the programmable controller. They are the data line 9, the timing line 10, the control lines 11, 12, the acknowledgement line 13, the alarm line 14, and the release line 15.

Lines 9 through 15 have the following functions:

Commands are transmitted via the data line 9 by the central processing unit 1 to the modules 7. Furthermore, data are transmitted via the data line 9 from the central processing unit 1 to the modules 7 and vice versa. Therefore, the data line 9 is a bidirectional data line.

The timing line 10 transmits a clock signal, which determines the speed of the serial information transmission via the data line 9.

The momentary bus state is established by means of the control lines 11 and 12. If both lines 11, 12 are carrying a high signal, then the bus is in the free-circuit condition. If the control line 11 goes to low, then this indicates the beginning of a command transmission. If the control line 12 goes to low, then this indicates the beginning of a data transmission. If both control lines 11, 12 go to low, then all bus interface connections 17 of the entire programmable controller are reset.

The modules 7 communicate the transfer of commands or data, or rather indicate the end of a data transmission via the acknowledgement line 13.

The modules 7 can request an alarm processing through the central processing unit 1 by way of the alarm line 14.

The outputs of output units are coupled into or rather separated from the bus system by means of the release circuit 15. The outputs are separated from the bus system, at the moment that the signals transmitted via the release circuit 15 goes to low. The release circuit 15 is preferably conducted through the bus interface connection 17 only in the case of functional modules and central subunits. In this manner, it is possible namely for the signal being transmitted via the release circuit 15 to be received simultaneously, and without a time delay, by all modules 7 that are linked to the release circuit 15.

The bus system of the programmable controller is obviously a serial bus system. Therefore, the processor 16 of the central processing unit 1 preferably has a standard, serial interface, to which at least the data line 9 is conducted. A parallel processing of the data takes place, of course, in the processor 16. Consequently, the processor 16 always undertakes a serial-parallel conversion when inputting or outputting data.

The peripheral units 7 are linked via bus interface connections 17 to the bus system. The bus interface connections 17 are preferably Application Specific Integrated Circuits (ASICs). A serial-parallel conversion of the transmitted or to-be-transmitted data takes place in these bus interface connections 17, in the same way as in the processor 16 of the central processing unit 1. The ASICs 17 are preferably integral components of the module parts, as described in the U.S. patent application Ser. No. 07/923,286, already referred to in conjunction with FIG. 1.

Lines 9 through 14 are run through the bus interface connections 17. This makes it possible, for example, for the bus interface connection 17 of the middle one of the three modules depicted in FIG. 2 to terminate, or rather separate the bus system, although this module 7 is not the last module of the strand in question. It will be clarified in greater detail in conjunction with FIG. 3, in which cases it is effective for the bus system to be terminated or separated.

Figure 3:
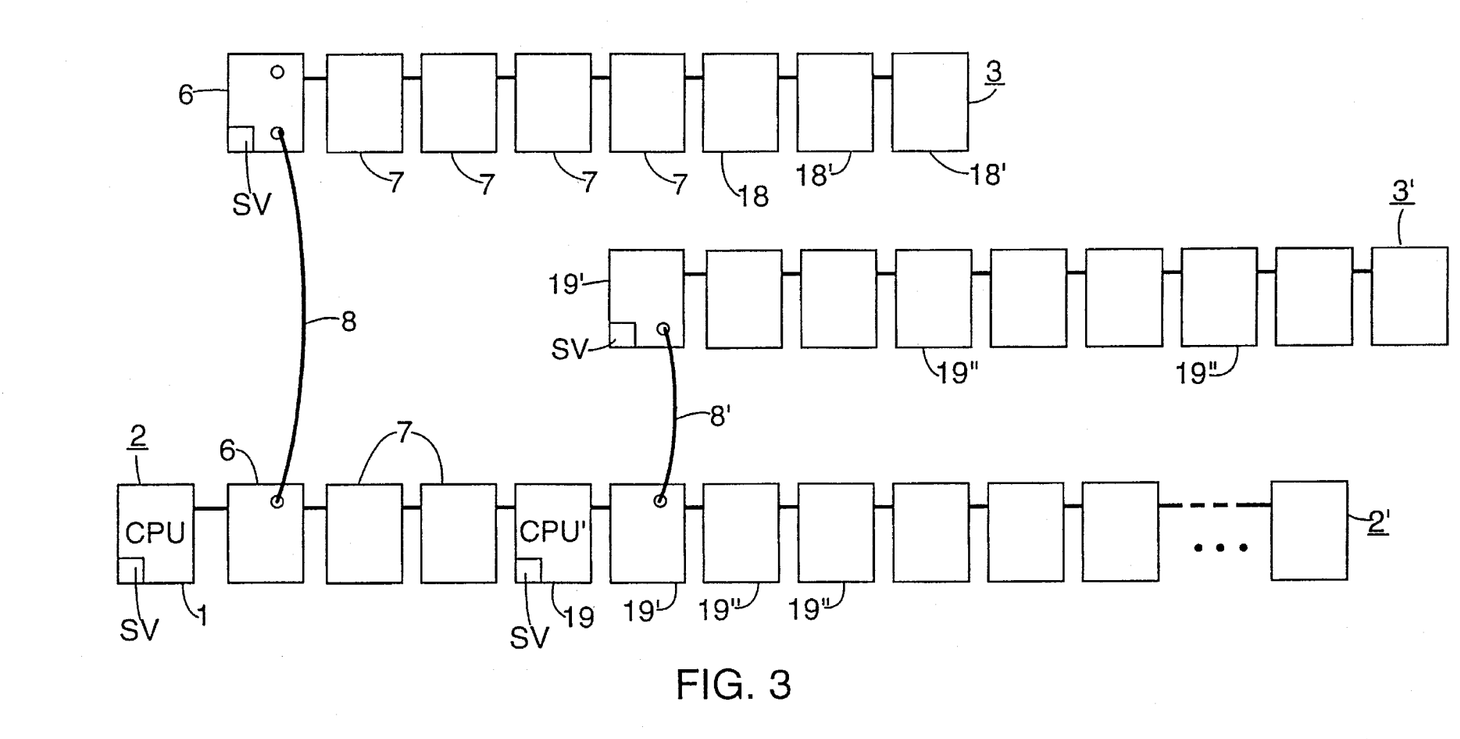
FIG. 3 depicts an alternate embodiment of the programmable controller.

FIG. 3 shows a possible configuration of the programmable controller, where it would be practical for there to be a separation of the bus system. In accordance with FIG. 3, the programmable controller consists of the central processing unit 1, the interface units 6, the modules 7, the functional module 18, the modules 18', and the central subunit 19. The functional module 18 and the central subunit 19 have the following mode of operation:

The functional module 18 is an intelligent peripheral unit, which can run a small subprocess independently. An example of a functional module is a controller module. To be able to affect the process and to acquire knowledge about it, outputs and inputs must, of course, be available and be able to be accessed by the functional module 18. The modules 18' arranged to the right of the functional module 18 are provided for this purpose.

It is evident that the exchange of information can take place between the functional module 18 and the modules 18' independently of the information exchange between the remaining parts of the programmable controller. Therefore, the functional module 18 is able to separate the bus system and to operate a separate, local bus segment. The size of this bus segment is determined by the fact that the sum of the modules 7 upstream from the functional module 18, the functional module 18, and the modules 18' downstream from the functional module 18 must not exceed the maximum number of modules per strand, in this case eight plus the interface unit.

The functional module 18 does not separate the bus system already at the time of start-up of the programmable controller, but rather only after it has received the command or rather release message for this from the central processing unit 1. Therefore, before receiving the release message, the central processing unit 1 can access the modules 18'. In contrast to this, the central subunit 19 always separates the bus system. The central processing unit 1 only knows that the central subunit 19 is present. The central processing unit 1 does not know the expansion level of the subsystem having the central subunit 19. In contrast to the functional module 18, the central subunit 19 has its own power supply SV, so that the power supply of the particular strand of peripheral units 7 will not be overloaded by the subsystem, which itself can have a system expansion of up to four interface units 19' and 32 modules 19''.

Of course, one central subunit 19 or one functional module 18 can be arranged in each strand 2–5 of peripheral units 7. In the same way, such functional modules 18 and central subunits 19 can also be arranged in the subsystem, whose central processing unit represents the central subunit 19. Thus, one is able to design hierarchically structured systems with expanded computing capacity.

Figure 4:
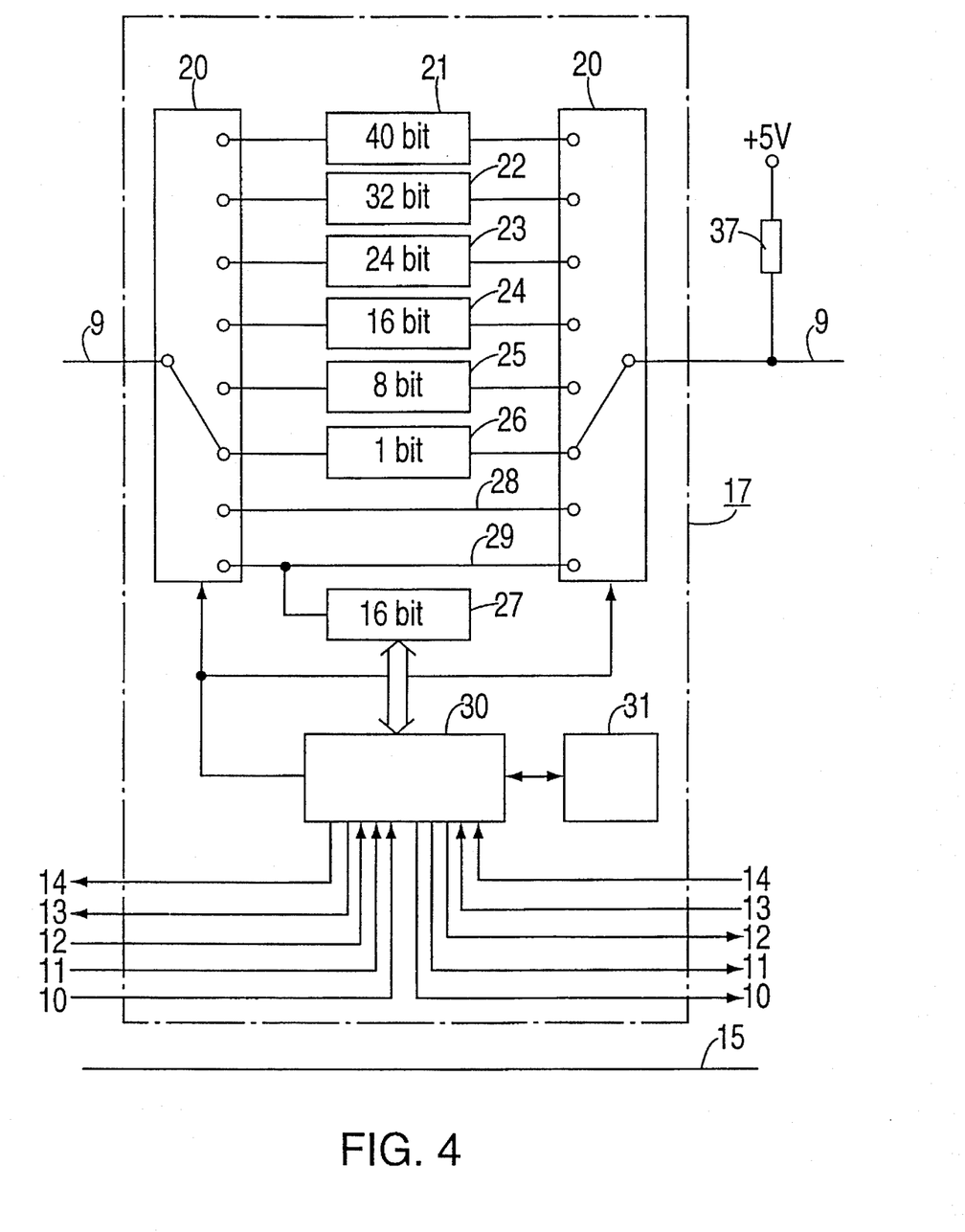
FIG. 4 depicts the essential structure of the bus interface connections.

The inner structure of the bus interface connections 17 is depicted in a simplified version in FIG. 4. FIG. 4 thereby shows only those parts of the bus interface connection 17 which are important for the understanding of the present invention. In accordance with FIG. 4, the data line 9 is conducted in the bus interface connections 17 via two semiconductor multi-circuit switches 20, in the following also called multiplexers 20. By means of the multiplexers 20, it is established whether and, in some instances, which of the registers 21 through 26 is switched into the data line 9. If none of the registers 21 through 26 is switched into the data line 9, then in case of data transmissions, the data line 9 is short-circuited via line 28. When commands are transmitted, the multiplexers 20 connect the data line 9 to line 29. In this manner, it is possible to load the transmitted command into the 16-bit shift register 27 and, on the other hand, to simultaneously relay it to the next bus interface connection 17.

The multiplexers 20 are always controlled in the same manner. They are triggered by the evaluating logic 30. When the evaluating logic 30 learns by way of the control line 11 that next a command will be transmitted, then line 29 is always selected. If, on the other hand, the control line 12 goes to low, then one of the other data paths 21 through 26, 28 is activated. The evaluating logic 30 decides which of the other data paths 21 through 26, 28 will be activated on the basis of the last command that was transmitted and stored in the register 27. Of course, the evaluating logic 30 also evaluates its knowledge of the module 7, in which the bus interface connection 17 is situated. This knowledge is filed, for example, in the memory unit 31. Alternatively, it is also possible, of course, for the evaluation unit 30 to be programmed accordingly or hardware-wired.

The evaluating logic 30 is, of course, also connected to registers 21 through 26, so that it is able to read data out of these registers, or rather store data in these registers. During these restoring operations, a serial-parallel conversion is undertaken, inter alia. However, the corresponding interconnected wiring configurations are not shown in FIG. 4 for the sake of clarity.

The setting of the multiplexers 20 does not change for as long as a new command is not transmitted. To transmit information via the bus system, commands and data are alternately transmitted via the data line 9.

When data or commands are transmitted, the command-control line 11 or the data-control line 12 initially go to low. The information transmission then begins after a short delay of approximately one clock cycle. At the end of the information transmission, the triggered control line 11 or 12 again goes to high. As a result, the modules 7 retrieve the transmitted information and apply a low signal to their acknowledgement circuit 13. As a result, the central processing unit 1 knows that the information transmission was successfully concluded. If the check-back signal from the modules 7 does not follow within a preset delay of, for example, 500 nanoseconds, then this is interpreted as a transmission error, and the transmission is repeated.

As mentioned above, the peripheral units 7, 18, 18', 19, as well as the interface units 6 evaluate transmitted commands and react to specific commands. There are commands, which all modules 7 of the programmable controller, in some instances also all interface units 6, react to;

commands, which all or a part of the modules 7 of a strand 2–5, in some instances also the interface unit 6 of this strand, react to; and commands, which only one single module 7 reacts to.

In the following, the latter commands are called individual commands, the others group commands.

Figure 5:
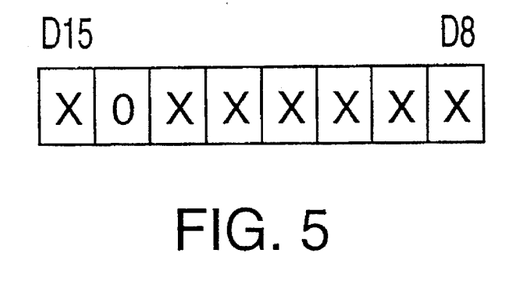
FIGS. 5 and 6 depict the command structure.

FIG. 5 depicts the structure of a group command. According to FIG. 5, a group command has the length of 1 byte or 8 bits. Bit D15 thereby establishes whether it is a question of a read command or a write command. Bit D14 must be zero, since it is used to distinguish between individual commands (when bit D14 has the value 1) and group commands (when bit D14 has the value zero). Bits D13 and D12 establish which of the four strands 2–5 of the programmable controller should be accessed. Bits D11 through D8 determine the command to be executed, for example the reading or writing of the process image.

Since the "reading" or "writing" function is already established by bit D15, 32 different commands can be realized altogether. Examples of such commands are "read in process image inputs", "read out process image outputs" and "read bus expansion".

Figure 6:
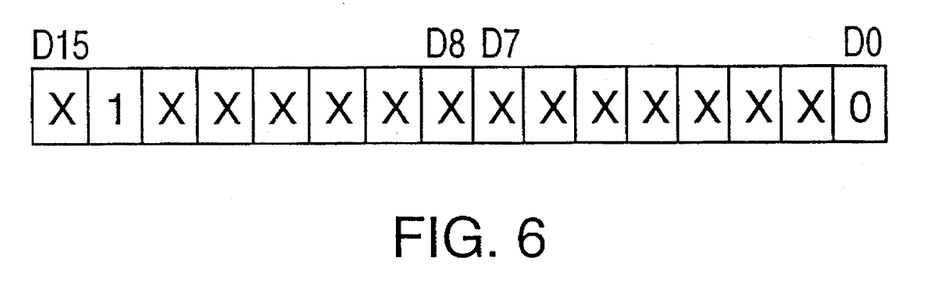

FIG. 6 shows the structure of one individual command. The significance of bits D15 through D12 was already described for the group command. Bits D11 through D9 establish which module 7 of the selected strand 2–5 is supposed to be accessed. Bits D8 through D1 define this access in detail. The information of bit D15 is again evaluated, in addition, here as well. It establishes whether it is a question of a read or a write access. Typical commands are, for example, the "write data block" or "read data block" command, the releasing of a bus segment for a functional module, or byte/word/double-word accesses, or the alarm acknowledgement.

Bit D0 is always zero. This allows the modules 7 to recognize faulty command transmissions. In principle, such an error recognition is also possible for group commands. In this case, however, group commands having a full 16-bit length would also have to be transmitted. Bits D7 through D1 would then be insignificant. Bit D0 again has the value zero as a frame mark bit. Optionally, bit D0 can also be a parity bit.

When group commands are transmitted in a short form, i.e., with an 8-bit length, a limited error recognition is likewise still possible. When the command-control line 11 goes to low, all bits D0 through D15 of the command register 27 are set, namely, to one, with the exception of bit D8. Bit D8 is set to zero by the evaluating logic 30. When a group command is transmitted via the data line 9, the value of bit D0 is a zero after an 8-bit data transmission. It can thus be controlled whether a correct number of bits, namely 8, were transmitted.

Several typical command/data transmissions will now be described by way of example in the following. To clarify these command/data transmissions, reference is made to FIG. 7. In accordance with FIG. 7, the strand 2 of the programmable controller consists of the interface unit 6 and of several modules 32 through 36.

Figure 7:
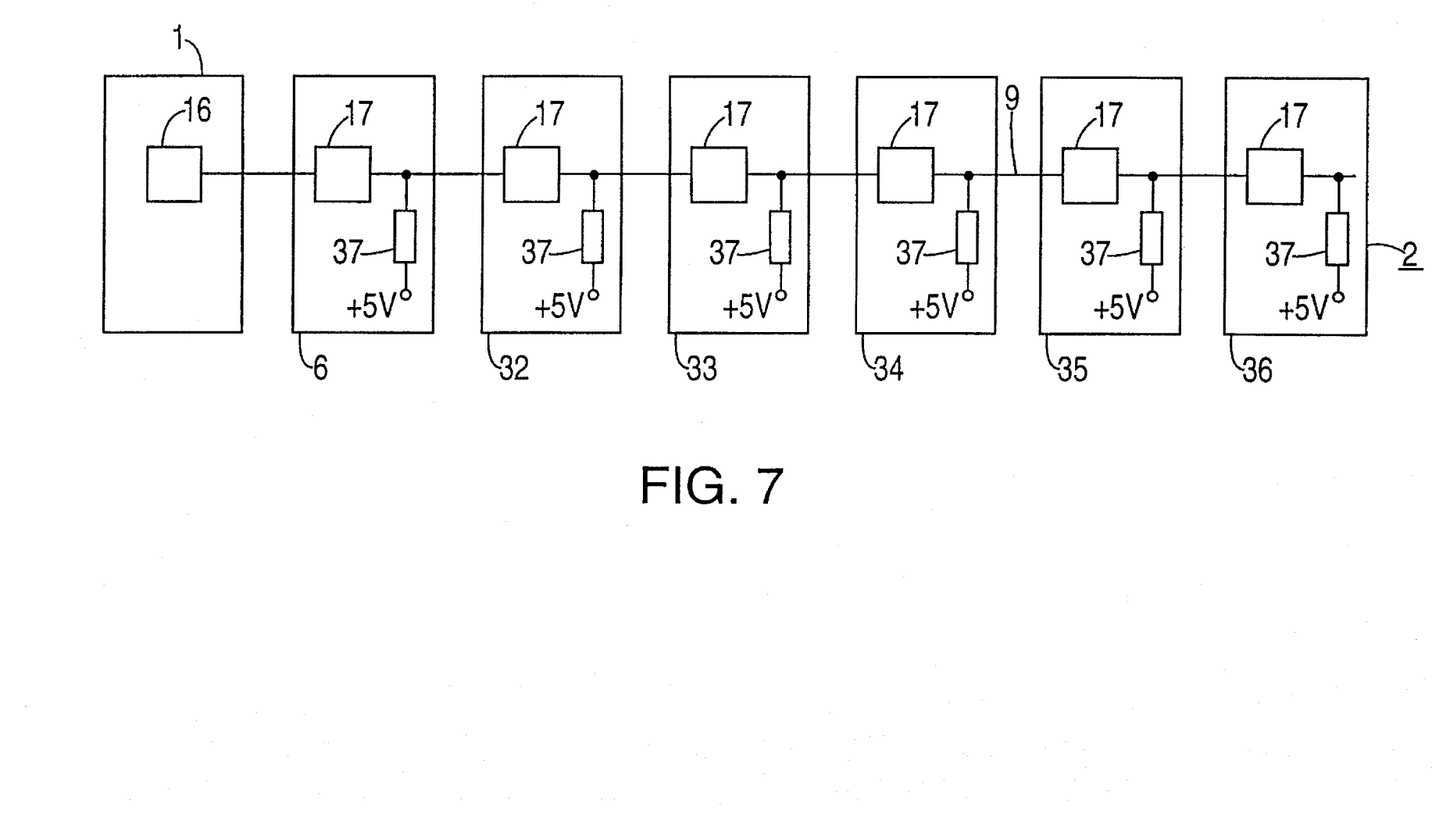
FIG. 7 depicts a partial structure of the programmable controller.

Module 32 is a 16-bit digital-input module. Module 33 is a 16-bit digital-output module. Module 34 is an 8-bit digital-input module. Module 35 is an 8-bit digital-output module. Module 36 is a functional module.

When the programmable controller is started up, the command "read in expansion level" is initially output for strand 2. The command "read in expansion level" is a group command, which acts on the selected strand, in this case strand 2. The result of this command is that in each existing module of strand 2, the shift register 26 is switched with the value zero into the data line 9.

Since the data line 9 on the side of the bus interface connections 17 facing away from the central processing unit 1 is connected via pull resistors 37 to the supply voltage, a zero bit is in fact output by the last module 36 as a message for its own module 36. However, after that, 1-bits are always passed on. The reason for this is that the pull resistor 37 of this module 36 always retains the data line 9 on the side facing away from the central processing unit 1 at one.

The central processing unit 1 reads in one word, i.e., 16 bits, from the strand 2 in question. The number of input zero bits indicates the number of peripheral units of the strand 2. The interface unit 6 is also included in the count for this number as a peripheral unit for reading the expansion level.

On the basis of the above described determination of the expansion level, the central processing unit 1 knows that five modules 32 through 36 and the interface unit 6 are connected to it in the given exemplified embodiment in strand 2. This information, namely six linked units, is already utilized at the time the next command is executed by the central processing unit 1.

To identify the units that are linked to the central processing unit 1, the type identifier of the peripheral units is determined for each strand, thus in the given example for strand 2. For this purpose, the central processing unit 1 outputs the group command, "transmit type identifier" for strand 2, and then reads in two bytes as data per peripheral unit, thus in the present case, 12 bytes. The modules 32 through 36 and the interface unit 6 switch their bus interface connections 17 so as to allow the 16-bit shift register 24 to be read out. The type identifier, which is stored with remanence (i.e., residual induction) in each unit in a type-identifier register, had been previously stored in this register 24. Stored in the type-identifier registers of the units is information pertaining to how large the address spaces for inputs and outputs are, and which type of module is involved (for example, interface unit, analog input module, digital output module, etc.).

Next, the central processing unit 1 parameterizes modules 32 through 36. Up until now, the individual modules 7 did not know, for example, in which module slot they were arranged, thus which address was assigned to them.

To parameterize the individual modules, the central processing unit 1 outputs the group command "retrieve parameters" for strand 2. It then outputs two bytes per module as data. The data are again passed through the 16-bit shift register 24 into the bus interface connections 17 and retrieved into modules 32 through 36 by means of serial-parallel conversion after the data transmission ends. The transmitted parameters comprise at least the addresses under which the modules 32 through 36 are later addressable, as well as one bit, indicating whether these addresses are valid. Furthermore, still other parameters are specified for modules 32 through 36, for example whether they have alarm capability, whether they are supposed to output or input a frame mark bit along with the process image transfer, and how they are supposed to perform in case of a blocking of the release circuit 15.

In contrast to the reading in of the expansion level and transmission of the type identifier, the interface unit 6 switches through the data line 9 when modules 32 through 36 are parameterized. The reason for this is that the interface units 6 are self-addressing. When an interface unit is newly added to the system, it immediately signals this to the interface unit 6, which is connected to it in incoming circuit. It then learns of its configuration in the programmable controller from this interface unit 6. Thus, from the time contact is made with the series-connected interface unit 6, the interface unit 6 knows whether the strand address $00_2$ (for strand 2), $01_2$ (for strand 3), $10_2$ (for strand 4) or $11_2$ (for strand 5) is assigned to it.

The programmable controller is automatically configured, as described above in conjunction with FIG. 7, for all strands 2–5 in sequence. After the device has completed its run-up, the central processing unit 1 knows, as a result, the number and grouping of the peripheral units 6, 7, 18, 19, 32 through 36 linked to it.

After start-up of the programmable controller, as described above, normal operation follows with process image transfer, process alarms, alarm processing, analog input/output, etc. The process image transfer of the inputs and outputs is described by way of example in the following.

Two digital input modules, namely module 32 and module 34, are arranged in strand 2 of the programmable controller in the example illustrated in FIG. 7. The module 32 has 16 inputs, module 34 has eight. The central processing unit 1 is aware of this factual situation on the basis of the start-up of the unit, as described above.

After transmission of the group command, "read in process image inputs", module 32 has queried the data to be read into the central processing unit 1 from its process inputs and stored it in the 16-bit shift register 24. Analogously, module 34 has stored its input data in the 8-bit shift register 25.

After the appropriate command is entered, the central processing unit 1 begins to read in the data. While the data are read into the central processing unit 1, modules 32, 34 connect their shift register into data line 9. The other modules 33, 35, 36 switch through data line 9. Thus, only the digital-input modules 32, 34 react as strand 2 to the command, "read in process image inputs". The data that have been input into the central processing unit 1 are, therefore, without exception, useful data, since the modules 33, 35, 36 without digital inputs do not feed data into the data line 9. Therefore, the central processing unit 1 inputs only three bytes of data, namely two bytes for the module 32 and 1 byte for module 34. Of course, the same procedure also takes place for strands 3 through 5.

The process image transfer takes place analogously for the outputs. Here as well, on the basis of the preceding identification run, the central processing unit 1 knows the configuration of strands 2–5 and, therefore, knows how large the data length to be output is. The digital output modules 33, 35 connect their shift register with 8, 16, or 32 bits (depending upon the number of output channels) into the data line 9, the other modules 32, 34, 36 switch through data line 9. Therefore, when the process image transfer of the outputs takes place, only useful data are transmitted, no blank data. Here, as well, all strands 2 through 5 are operated one after another.

Modules 32 through 35 are parameterizable to such an extent that they transmit or receive a frame mark during the process image transfer. During the process image transfer, the frame mark consists of one byte having a preset bit pattern. When the inputs are read into the central processing unit 1, this byte is compared to the specified bit pattern. Conversely, when the process outputs are read out, the byte received by modules 33, 35 is checked for the specified bit pattern. This frame mark makes it possible for transmission errors to be detected.

When, along with this, modules 32 through 35 feed in or query their frame mark byte, the data transmission takes place via registers which are 8 bits longer than inputs/outputs on the modules. Thus, for example, during the process image transfer of the inputs, a 16-bit-digital input module transmits 24 bits, namely 16 bits of useful data plus 1 byte frame mark.

To clarify the alarm processing, the assumption is made in the following that the functional module 36 is a limit monitoring indicator, thus a module, which signals when [values] exceed or fall below a limiting value.

When the signal to be monitored comes into a critical range, module 36 transmits an alarm via alarm circuit 14 to the central processing unit 1. Initially, the central processing unit 1 does not know which module has triggered the alarm and what kind of alarm it is. Therefore, the central processing unit 1 outputs the command, "read in alarms". Each module of the operated strand switches its 1-bit register 26 into data line 9. If the module 32 through 36 in question has not triggered any alarm, then its data bit has the value one, otherwise zero.

The central processing unit 1 reads in 1 byte and, in this manner, can determine which module has released an alarm.

The central processing unit 1 then outputs the group command, "read in alarm types". The modules, which have triggered an alarm then switch their 8-bit register 25 into data line 9. The other modules switch through data line 9.

The types of alarms pending at the modules had been stored beforehand in register 25 by the modules triggering the alarm. Thus, by evaluating the inputted bytes, the central processing unit can determine which alarms are present at which module. The sequence of the alarm processing and, thus, also the priority of the alarms is not yet established. It is able to be specified by the program, perhaps even by the user. Examples of possible alarms are process alarms and diagnostic alarms.

Process alarms are alarms which are triggered by input modules, when these modules are fed input signals, which require an immediate reaction from the central processing unit 1.

Diagnostic alarms are triggered when the modules establish on the basis of the self-monitoring properties that there must be malfunctions within the module, or rather in their circuit wiring to the process.

In the case of diagnostic alarms and also during parameterization of functional modules, larger quantities of data must sometimes be transmitted. For this, the programmable controller knows the individual commands, "load data block beginning address and length" and "write data block" or "read data block".

A single module is addressed by means of the command "load data block starting address and length". As a result, this module, for example the functional module 36, switches its register 24 into the data line 9. The central processing unit then transmits 16 bits. On the basis of these bits, the functional module 16 knows how many words are supposed to be transmitted and where the initial address of the words to be transmitted lies in the address area of the functional module 36. When the data are transmitted, the other modules 32 through 35 switch through the data line.

The central processing unit 1 then transmits the single command "read data block" or "write data block". A continuous transmission of the data block to be transmitted is then begun. After 16 bits at a time, the functional module 36 accepts the last data word that was read in from the register 24, or rather stores the next data word to be transmitted in register 24. The other modules 32 through 35 switch through the data line during the data transmission.

In addition to the individual commands described above and to group commands acting on a strand 2–5, there are also group commands which act simultaneously on all strands 2–5. An example of such a command is the power-failure warning. When a notch in the supply voltage is detected in the central processing unit 1, then this command is output (preferably as an 8-bit command). Not only is this group command received and evaluated by the modules 7 in all four strands 2–5 independently of the value of bits D13 and D12, but, in addition, all affected modules 7 in all four strands 2–5 react to it. The reaction of the modules 7 can consist, for example, in that important data are written in the EEPROMs, for as long as the supply voltage can still be buffered.

As clarified in detail above on the basis of examples, an efficient programmable controller having a serial backplane bus is made available hereby for the first time. However, the present invention is not limited, of course, to the given exemplified embodiment. Other configurations of the programmable controller, of the bus interface connection, of the command sets and the like are able to be realized without having to digress from the idea of the present invention.

What is claimed is:

1. A method for transmitting digital information, which includes both commands and data, between a main unit and a plurality of subunits of an electrical device, in which the subunits are subordinate to the main unit and in which each subunit has a plurality of shift registers with different bit lengths, said method comprising the steps of:

a) transmitting the commands and the data via a serial bus system;

b) providing at least one data line in the serial bus system over which the commands and data are alternately transmitted;

c) providing one timing line in the serial bus system for specifying a shared system clock;

d) providing at least one control line in the serial bus system for transmitting a control signal;

e) conducting the data line through each subunit and simultaneously coupling in each subunit a stub shift register to the data line when a command is being transmitted over the data line; and f) coupling one of the plurality of shift registers in each subunit in series in the data line when data is being transmitted.

2. The method according to claim 1, further comprising the step of:

g) determining anew after each command is transmitted in each subunit which of the plurality of registers is coupled in series in the data line.

3. The information transmission method according to claim 2, further comprising the steps of:

h) providing that each command includes a plurality of single commands and a plurality of group commands;

i) in response to a single command, a predetermined subunit of the plurality of subunits couples one of its plurality of shift registers in series with the data line, and all other subunits pass the data line through; and j) in response to a group command, each subunit of a predetermined group of subunits couple one of their plurality of shift registers in series in the data line.

4. The method according to claim 1, further comprising the steps of:

g) transmitting a particular command over the data line, which particular command addresses only a subset of subunits in the plurality of subunits;

h) coupling in series in the data line one of the plurality of shift registers in each of the subunits in the subset of subunits that was addressed by the particular command when data is next transmitted; and i) conducting the data line through in each subunit of the plurality of subunits that was not addressed by the particular command when data is next transmitted.

5. The method according to claim 4, further comprising the step of determining anew after each command is transmitted in each subunit which of the plurality of registers is coupled in series in the data line.

6. The method according to claim 1, further comprising the steps of allocating a first part of each command to a predetermined subunit of the plurality of subunits, wherein said predetermined subunit acts upon said first part, which first part is a single command, and allocating a second part of each command to several of the subunits, wherein said several of the subunits act upon said second part, wherein said second part is a group command.

7. The method according to claim 1, further comprising the steps of:

g) providing that each command includes a plurality of single commands and a plurality of group commands;

h) in response to a single command, a predetermined subunit of the plurality of subunits couples one of its plurality of shift registers in series with the data line, and all other subunits pass the data line through; and i) in response to a group command, each subunit of a predetermined group of subunits couple one of their plurality of shift registers in series in the data line.

8. The method according to claim 1, wherein each of the plurality of subunits has an output side which is downstream of the main unit, and further comprising the steps of:

g) using a pull resistor to maintain the data line on the output side of each of the plurality of subunits at a predefined steady state voltage level;

h) transmitting, upon initiation of power to the electrical device, from the main unit a command for determining a number and a grouping of the plurality of subunits;

i) coupling in series in the data line, after the step h) of transmitting, one of the plurality of registers in each of the plurality of subunits, wherein a value of at least one of the bits stored in said one register coupled in series in the data line has a value that differs from a value determined by the predefined steady state voltage level;

j) reading in with said main unit a number of bits via said data line, wherein the number of bits being read in is determined by a product of a bit length of said one register that is coupled in series in said data line and a maximum permissible number of subunits;

k) providing from the main unit a command for transmitting subunit-specific parameters to said plurality of subunits, after determining the number of subunits; and l) storing subunit-specific parameters data in said subunits in a particular one of the registers.

9. The method according to claim 8, further comprising the steps of:

m) providing a command from the main unit to the plurality of subunits, after transmission of the subunit-specific parameters, wherein said command relates to receiving operating parameters;

n) switching, as a result, by said subunits one of the registers into the data line;

o) providing, during subsequent data transmission, from said main unit a number of bits, the number of bits being determined by the product of the register length of said register switched into said data line and the number of subunits;

p) reading out, after the data transmission is concluded, by said subunits operating parameters stored in the register that has been switched into said data line; and q) parameterizing the plurality of subunits in accordance with these operating parameters.

10. A method for transmitting digital information, which includes both commands and data, between a main unit and a plurality of subunits of an electrical device, in which the subunits are subordinate to the main unit and in which each subunit has a plurality of shift registers with different bit lengths, said method comprising the steps of:

a) transmitting the commands and the data via a serial bus system;

b) providing at least one data line in the serial bus system over which the commands and data are alternately transmitted;

c) providing one timing line in the serial bus system for specifying a shared system clock;

d) providing at least one control line in the serial bus system for transmitting a control signal;

e) conducting the data line through each subunit and simultaneously coupling in each subunit a stub shift register to the data line when a command is being transmitted over the data line;

f) transmitting a particular command over the data line, which particular command addresses only a subset of subunits in the plurality of subunits;

g) coupling in series in the data line one of the plurality of shift registers in each of the subunits in the subset of subunits that was addressed by the particular command when data is next transmitted; and h) conducting the data line through each subunit of the plurality of subunits that was not addressed by the particular command when data is next transmitted.

11. The method according to claim 10, further comprising the step of determining anew after each command is transmitted in each subunit which of the plurality of registers is coupled in series in the data line.

12. The method according to claim 10, further comprising the steps of:

i) providing that each command includes a plurality of single commands and a plurality of group commands;

j) in response to a single command, a predetermined subunit of the plurality of subunits couples one of its plurality of shift registers in series with the data line, and all other subunits pass the data line through; and k) in response to a group command, each subunit of a predetermined group of subunits couple one of their plurality of shift registers in series in the data line.

13. A subunit for coupling to a modular programmable controller, which includes a main unit and a plurality of subunits coupled together via a serial bus system that includes at least one data line for transmitting information, one timing line for specifying a shared system clock, and a control line for transmitting control signals, said subunit comprising:

a bus interface connection linking said subunit to the serial bus system, said bus interface connection including:

(i) a shift register;

(ii) a means for coupling the shift register in series in the data line;

(iii) a means for passing the data line through the bus interface connection;

(iv) an additional shift register; and (v) a means for coupling the additional shift register to the data line when a command is transmitted over the data line.

14. The subunit according to claim 13, wherein the bus interface connection further comprises a plurality of shift registers with different bit lengths, and a means for coupling one of the plurality of shift registers in series in the data line.

15. The subunit according to claim 14, wherein the plurality of shift registers comprises a shift register with a bit length of one bit, and a plurality of shift registers with bit lengths that are integral multiples of eight bits.

16. The subunit according to claim 13, wherein the bus interface detachably connects a first part of said control line upstream of said interface and a second part of said control line downstream of said interface, said interface also detachably connecting a first part of said timing circuit upstream of said interface and a second part of said timing circuit downstream of said interface.

17. The subunit according to claim 13, wherein the bus interface connections further comprises a a release circuit for outputting data from the subunits.

18. The subunit according to claim 16, wherein the serial bus system further comprises a release circuit for outputting data from the subunits.

19. The subunit according to claim 18, wherein the release circuit is conducted through the bus interface connection.

20. A programmable module for coupling to a main unit via a serial bus system, in which multiple programmable modules are coupled to the main unit via the serial bus system, said programmable module comprising:

a) a bus interface for coupling to the serial bus system, and including:

(i) a data input line for coupling to a data line of the serial bus system and receiving transmitted information;

(ii) a timing input line for receiving a shared system clock signal from the serial bus system; and (iii) a control input line for receiving transmitted control signals from the serial bus system;

(iv) a data output line for coupling to the data line of the serial bus system and outputting the transmitted information received on the data input line;

(v) a timing output line for outputting the shared system clock signal to the serial bus system; and (vi) a control output line for outputting the transmitted control signals received on the control input line to the serial bus system;

b) a plurality of shift registers, each having a different register bit length;

c) a multiplexer switching the data input line to one of the plurality of shift registers; and d) a demultiplexer switching between one of the plurality of shift registers and the data output line.

21. The programmable module according to claim 20, wherein the plurality of registers includes a register with a bit length equal to zero.

22. The programmable module according to claim 21, wherein possible register lengths of the plurality of registers are 0 bit, 1 bit, and integral multiples of 8 bits.

23. The programmable module according to claim 20, wherein the bus interface further comprises:

an additional control input line for coupling to one additional control line of the serial bus system; and an additional control output line for coupling to the one additional control line of the serial bus system, whereby the programmable module can differentiate between command and data transmissions.

24. The programmable module according to claim 20, wherein the bus interface further comprises:

at least one acknowledgement input line for receiving acknowledge signals being transmitted from other programmable modules to the main unit; and at least one acknowledge output line for passing on the acknowledge signals received by the one acknowledgement input line, and for transmitting an acknowledge signal from the programmable module to the main unit.

25. The programmable module according to claim 24, wherein the bus interface further comprises:

an alarm input line for receiving alarm signals for the main unit which alarm signals are triggered by other programmable modules; and an alarm output line for passing on the alarm signals received by the alarm input line and for transmitting an alarm signal from the programmable module to the main unit.

26. The programmable module according to claim 20, further comprising means for terminating the serial bus system wherein said terminating means is coupled to the bus interface.

27. The programmable module according to claim 20, wherein said bus interface further comprises a release input line and a release output line by which the data, control and timing output lines are couplable into or separable from the serial bus system.

28. The programmable module according to claim 26, comprising release input and output lines, wherein the release input and output lines are directly conducted through the bus interface, whereby a release or blocking signal transmitted via the release input and output lines is able to be received by multiple programmable modules simultaneously.

29. The programmable module according to claim 20, wherein the bus interface comprises an application specific integrated circuit.

30. The electrical device according to claim 20, further comprising a pull resistor, wherein either the data input line or the data output line, whichever is on a side facing away from the main unit, is coupled to a pull resistor.

31. An electrical device comprising:
a) a main unit having a processor;
b) a serial bus system including:
   (i) a data line for transmitting information;
   (ii) a timing circuit for specifying a shared system clock; and
   (iii) a control line for transmitting control signals; and
c) a plurality of subunits being interconnected with the main unit and each other by the serial bus system, each subunit having a bus interface connection which includes:
   (i) a shift register;
   (ii) a means for coupling the shift register in series in the data line;
   (iii) a means for conducting the data line through the subunit;
   (iv) an additional shift register; and
   (v) a means for coupling the additional shift register to the data line, wherein the processor is coupled with the data line, the timing circuit and the control line when a command is transmitted over the dataline.

32. The electrical device according to claim 31, wherein the processor in the main unit includes a serial interface, and the serial bus system is linked to the serial interface of the processor.

\* \* \* \* \*